Dec. 19, 1922.                                                                1,439,236
                        H. H. HARRIS.
                    POWER PROPELLED TRUCK.
                     FILED MAR. 15, 1919.                          5 SHEETS-SHEET 1
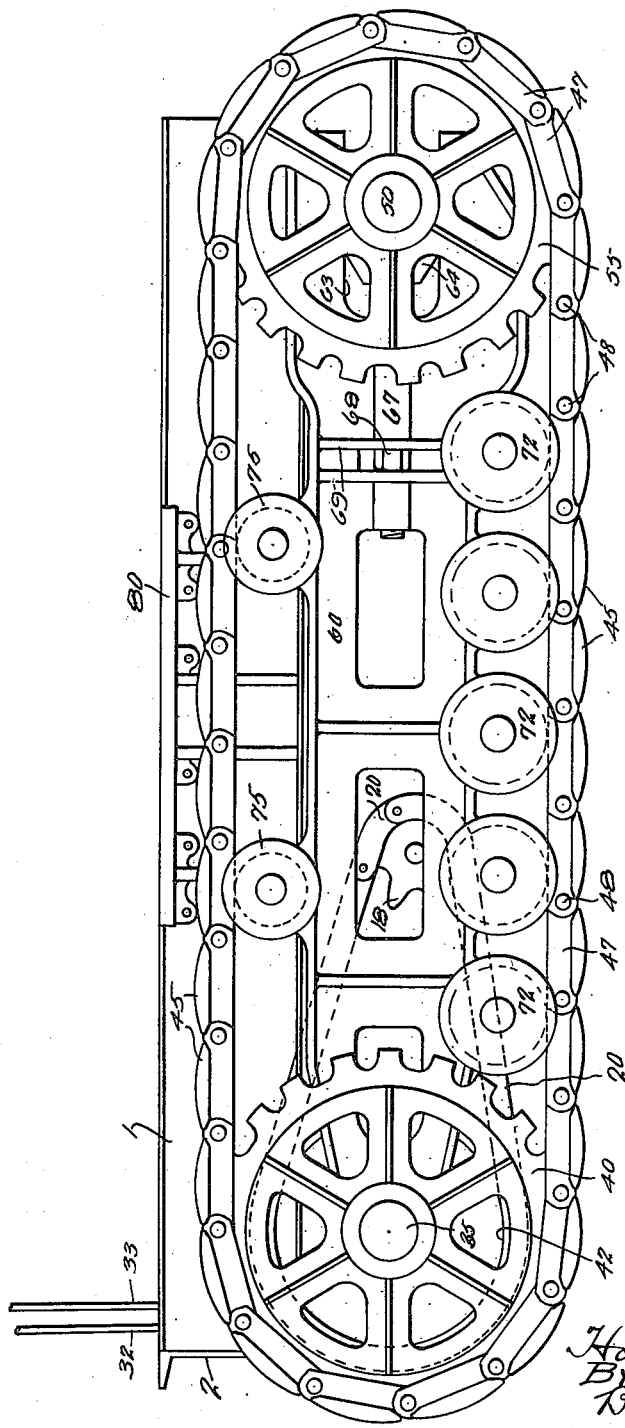

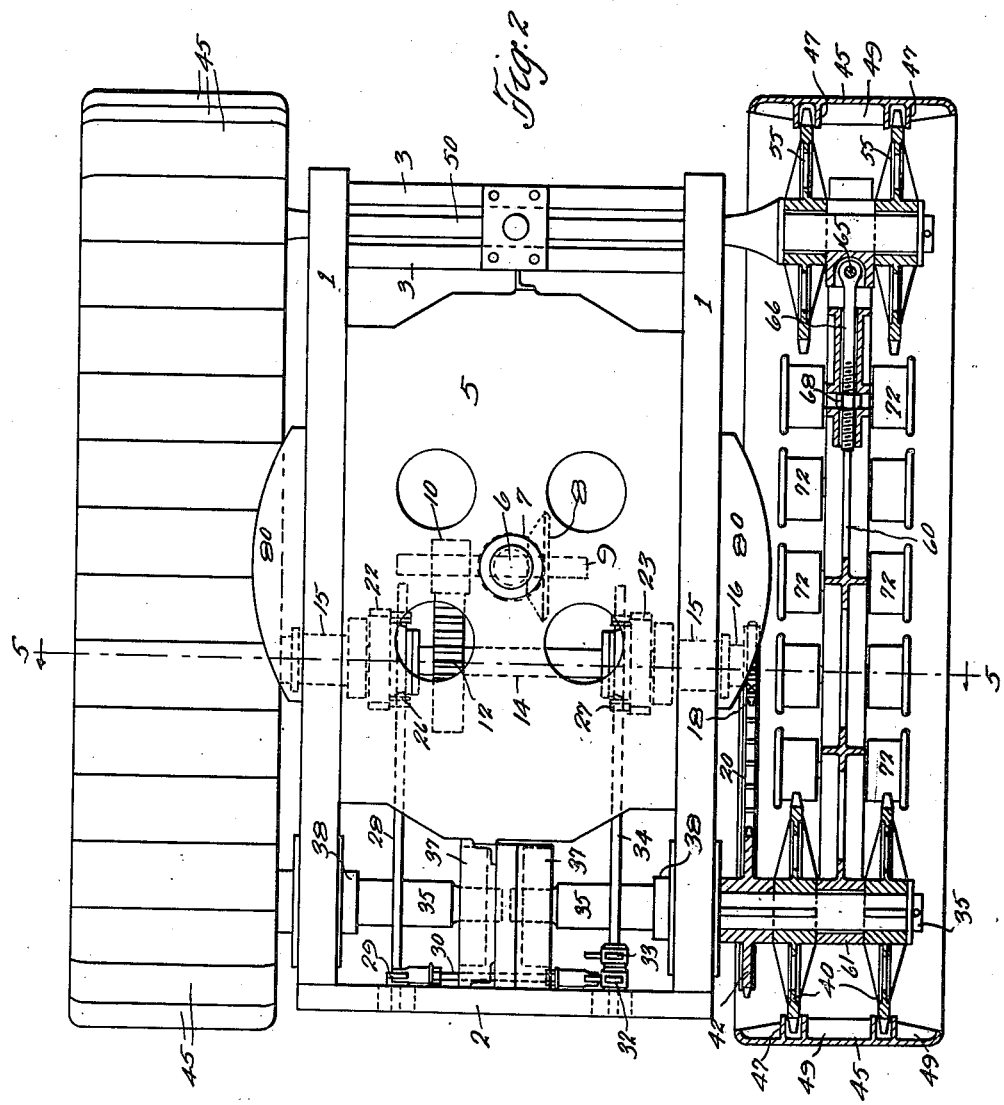

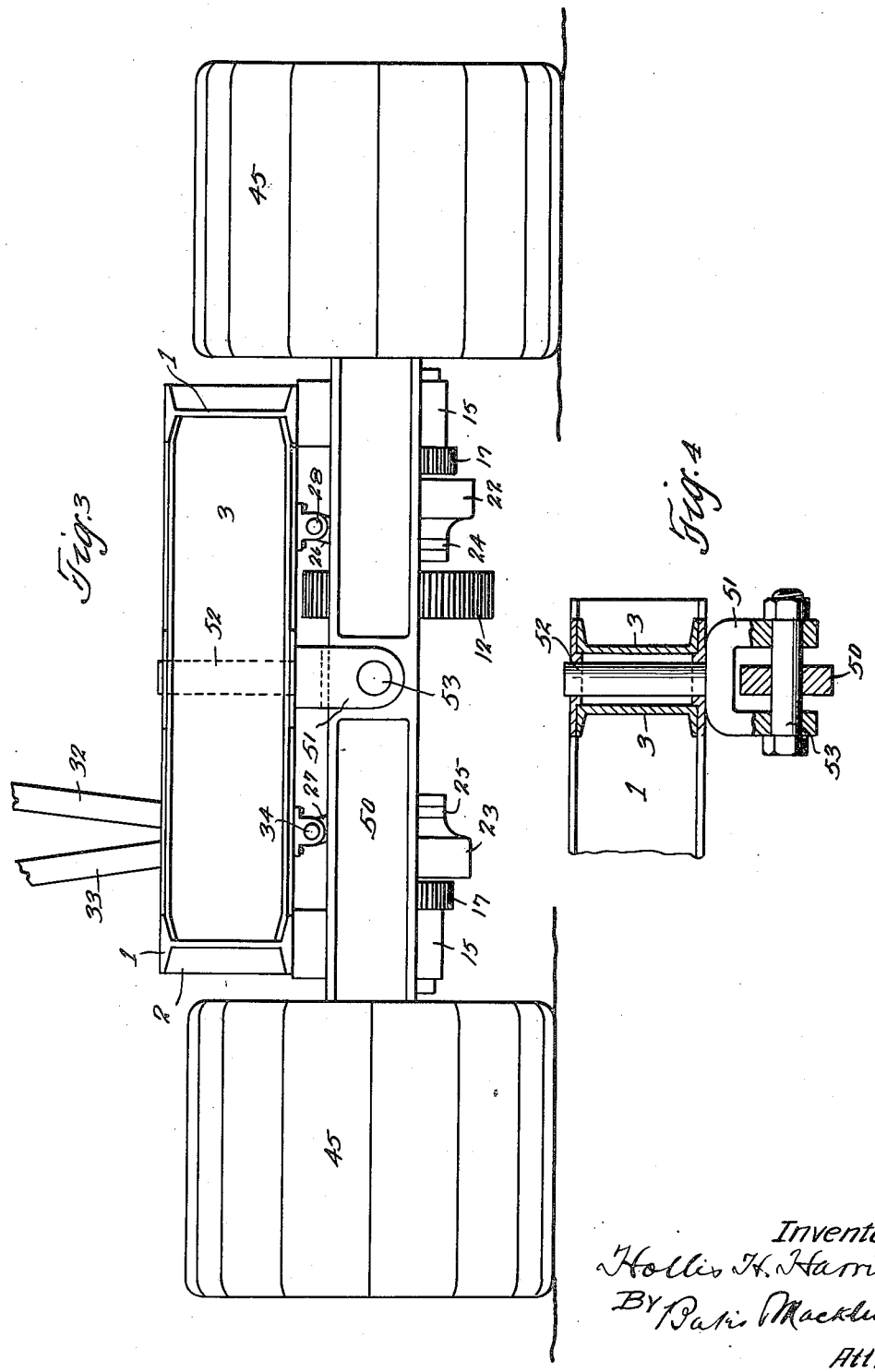

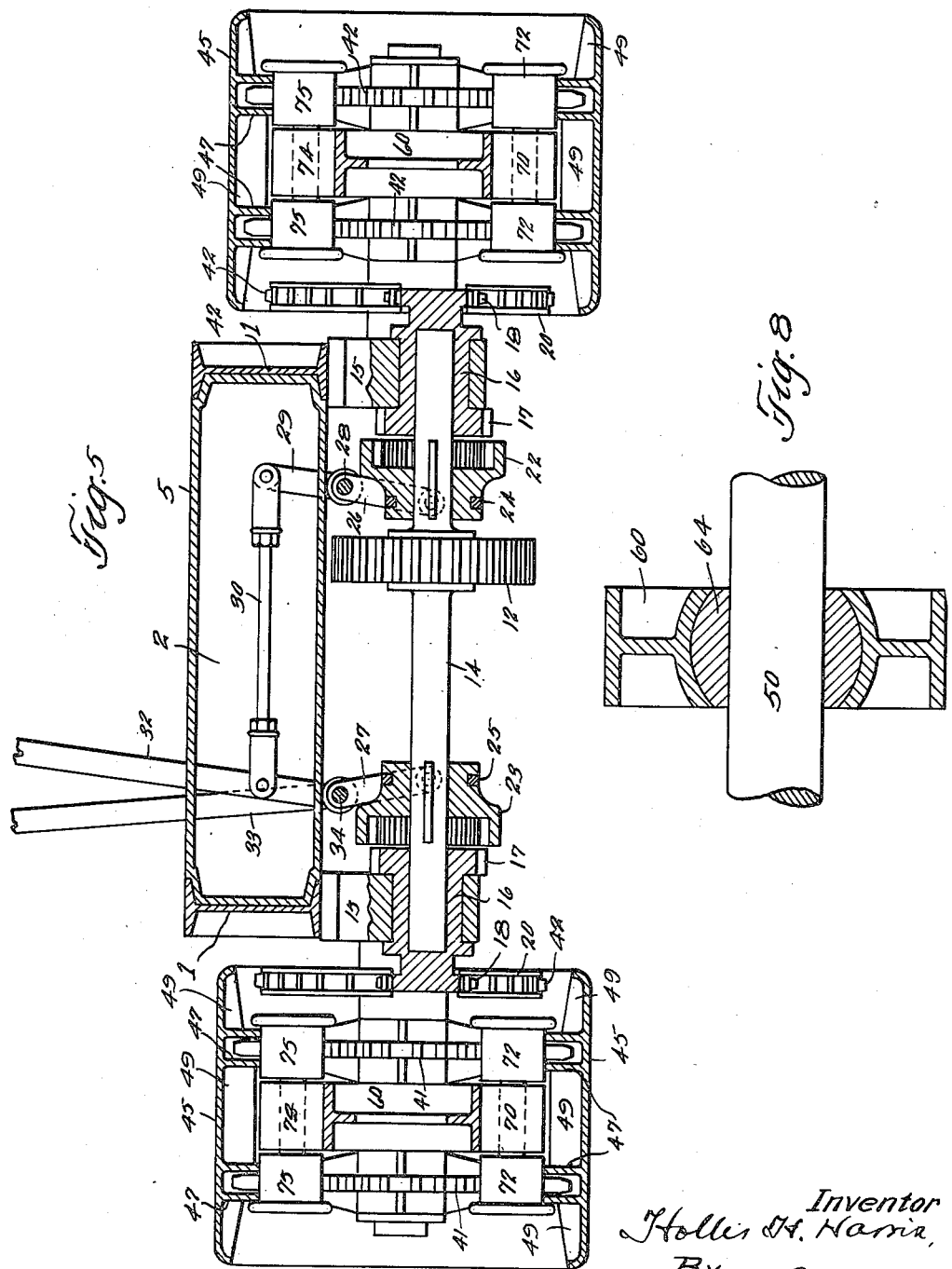

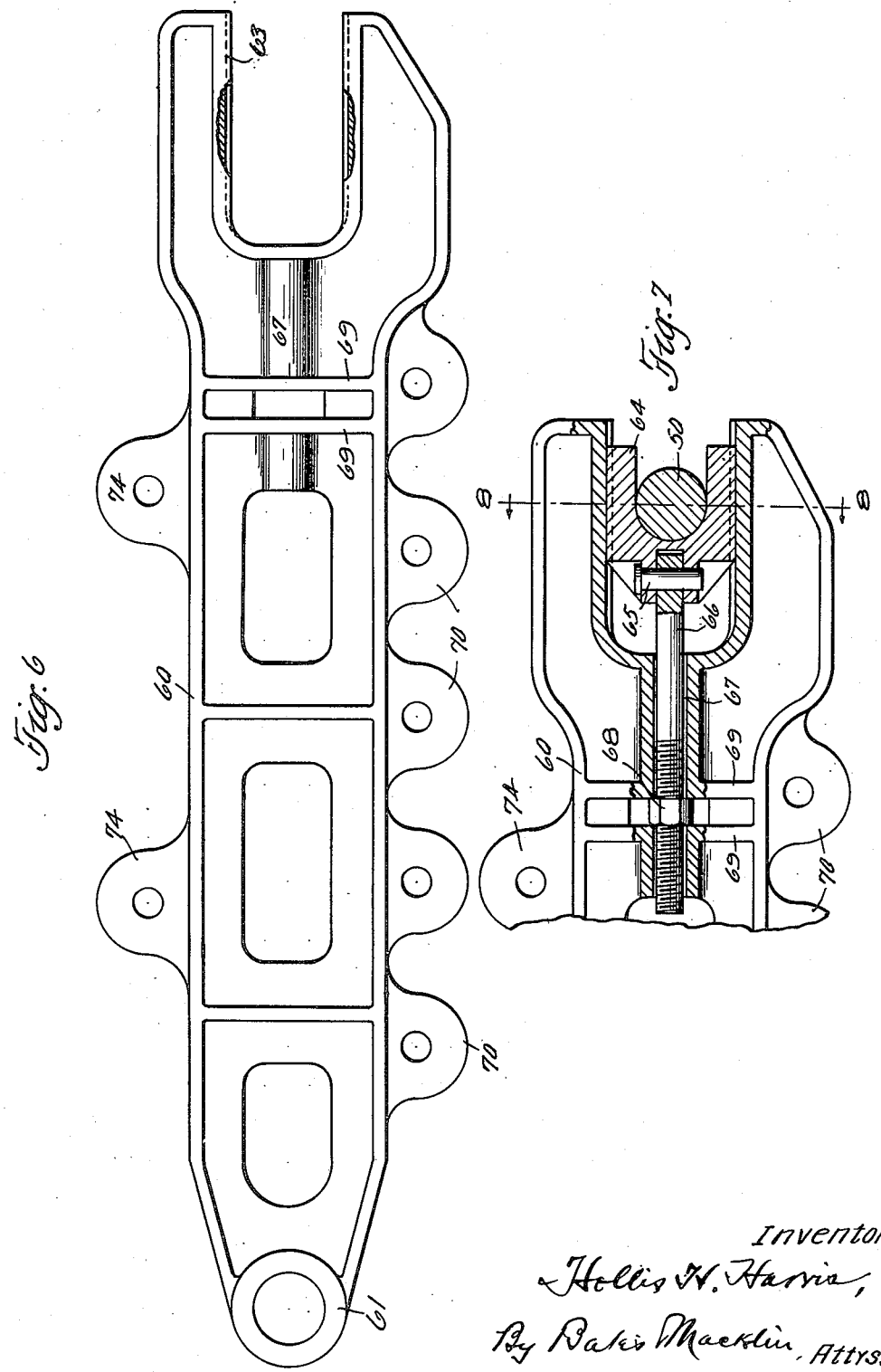

Patented Dec. 19, 1922.

1,439,236

UNITED STATES PATENT OFFICE.

HOLLIS H. HARRIS, OF LORAIN, OHIO, ASSIGNOR, BY MESNE ASSIGNMENTS, TO THE THEW SHOVEL COMPANY, OF LORAIN, OHIO, A CORPORATION OF OHIO.

POWER-PROPELLED TRUCK.

Application filed March 15, 1919. Serial No. 282,931.

*To all whom it may concern:*

Be it known that I, HOLLIS H. HARRIS, a citizen of the United States, residing at Lorain, in the county of Lorain and State of Ohio, have invented a certain new and useful Improvement in a Power-Propelled Truck, of which the following is a full, clear, and exact description, reference being had to the accompanying drawings.

The principal object of this invention is to provide a simple, stable and strong truck of the tractor type in which the truck frame is so mounted on endless flexible treads as to cause the treads to automatically conform to irregularities over which the truck may run. Another object is to so arrange the treads that they may be conveniently driven, each independently of the other. Still another object is to provide means for adjusting the bearings of the tread members longitudinally of the frame, whereby the wear of the tread belts may be compensated for and the belts may be kept taut.

In carrying out my invention I provide a truck frame with longitudinally aligned wheels at each side of the frame, the axles of which are connected by bridge-like members carrying thrust receiving wheels engaging the lower reach of the tread belt, and another object of the invention is to so connect these wheels with the truck frame that the frame has in effect a three-point suspension, allowing movement of the frame and at the same time allowing the tread belts to swing independently of the truck frame about the axis of the driving wheel of each tread.

More specific objects will become apparent in the following description which refers to the drawings. The essential characteristics of this invention are summarized in the claims.

In the drawings Fig. 1 is a side elevation of a truck embodying the present invention; Fig. 2 is a plan of the same, one of the tread members being shown in section, the plane of the section being substantially along the axis of the supporting wheels; Fig. 3 is a front elevation showing particularly the mounting of the front axle; Fig. 4 is a sectional detail of the front axle mounting; Fig. 5 is a transverse section taken substantially along the axis of the driving counter shaft and showing the chain drive connection with each tread and the clutch controls therefor, the plane of the section being indicated by the line 5—5 of Fig. 2; Fig. 6 is a detail view on an enlarged scale of one of the beams connecting the axles of each tread; Fig. 7 is a sectional detail of the forward end of such beam showing a swivel adjusting mechanism connecting this beam with the forward axle of each tread; Fig. 8 is a sectional detail on a slightly enlarged scale taken transversely of the beam, on the line 8—8 of Fig. 7.

Describing the parts by the use of reference characters, frame members 1 extend longitudinally of the frame and are connected at one end by an end member 2 and at the other end by a pair of separated cross struts 3. The intermediate portion of the frame may be braced by a casting, forming a platform 5 and secured between the inwardly turned flanges of the I-beams forming the side frame members 1. This platform is adapted to carry any suitable super-structure as for example, steam shovel mechanism including a power element which may be used for propelling the truck. I have shown a vertical shaft 6 having bearings in the frame plate 5 and carrying a bevel gear 7 at its lower end meshing with a lower gear 8 on a jack shaft 9 mounted transversely of the frame 5. This shaft may be driven by any power device on the truck.

On the shaft 9 is indicated a pinion 10 meshing with a gear 12 on the countershaft 14, extending transversely of the frame and having its ends supported in bearings 15 secured to the under side of the frame members 1. Within the bearings are driving elements 16 in the nature of sleeves, Fig. 5, rotatably receiving the ends of the shaft 14 and each at the inner end provided with a member 17 of a dental clutch. At the outer ends are shown sprocket teeth 18 engaging sprocket chains 20. Coacting with the clutch members 17 are internal dental clutch members 22 and 23 splined on the shaft 14 and each rotatably embraced by a collar, as at 24 and 25 respectively. These collars are provided with trunnions pivotally engaged by yokes 26 and 27 respectively. The yoke 26 is mounted on a rock shaft 28 provided with a rock arm 29 connected by a link 30 with a lever 32 for operating the corresponding clutch member 22. The yoke 27 is mounted on a rock shaft 34 to which is rigidly connected a hand operated lever 33 for operating the clutch member 23. Thus by operating either of these clutches 22 or 23 the shaft 14 may be connected with the chains 20 and drive the corresponding tread.

The driving axles are indicated at 35. These axle shafts have inner bearings in frame members 37, and outer bearings 38 secured to the lower sides of side frame members 1. These shafts project beyond the frame and provide a support for the supporting and driving sprockets 40, keyed to the shaft and engaging the treads 45, as will be presently more specifically described. Between the inner sprocket 40 and the bearing 38 is a sprocket 42 driven by the chain 20 and keyed to the shaft 35, whereby power is transmitted, through the gearing and clutches described, to the treads 45.

The endless tread preferably comprises a series of flights, each flight having spaced raised transverse ribs 47 embracing the teeth of the sprockets 40 and extended in one direction to form ears overlapping corresponding ears or tongues extended in the other direction, at the other side of the flight, whereby pins 48 may so connect the flights as to form, in effect, a chain. Bracing ribs 49 may extend from the ends of the flights to the ribs 47 and between the pairs of ribs 47 forming teeth engaged by the teeth of the sprockets.

The front axle 50 is shown as pivoted intermediately in a clevice 51, rigid with a vertical king pin 52, supported in plates connecting the struts 3, by a pivot pin 53. At the ends of the axle are provided bearings for sprockets 55 corresponding to the sprockets 40. The clevice 51 and pivot pin 53 are so arranged as to provide for moving the axle longitudinally of the frame as the clevice embraces the axle in such manner as to leave space at the front and rear sides of the axle, while allowing it to slide along the pin 53, as may appear from Fig. 4. This provides for an adjustment to tighten the belts.

Connecting the rear and front axles within the tread belts are beams 60, each having a bearing portion 61 embracing the rear axle and having a bifurcated forward end extending over the front axle. The inner surfaces 63 of this bifurcated portion are partially cylindrical to embrace a block 64 having complementary surfaces as shown in Figs. 6, 7 and 8. This block is swivelly attached by a pin 65 to a screw 66 extending rearwardly through a longitudinal opening in the beam 60, formed by an enlargement of the intermediate web of the beam as shown at 67. A nut 68 on the screw 66 between the two ribs 69 may serve to accomplish longitudinal adjustment of the screw and corresponding movement of the block 64 which extends over and embraces the axle 50. It will be noted that the cylindrical character of the block 64 and coacting surfaces 63 is such that the front axle may be tipped or sloped upwardly or downwardly with relation to this beam, and one of the belts may be tightened more than the other without binding any of the parts because of the swivel connection 65.

This beam 60 is preferably a casting comprising ribs and webs whereby it is convenient to provide projecting ears 70, which may serve as bearings for rollers 72 engaging the lower reach of the belt and hold it in contact with the ground. Similar ears 74 at the upper portion of the beam provide bearings for rollers 75, which serve merely to support the upper reach of the belt.

The table formed by the plate 5 and upper surfaces of the side frame members 1 may be extended by the use of brackets 80, secured to the sides of the beams 1 and presenting an upper surface on an even plane with the upper surface of said beams.

It will be noted that the arrangement described provides a three-point suspension of the truck frame. The result is that the frame may tilt with relation to the ground. The treads themselves are substantially rigid throughout by reason of the beam 60, but they may swing about the axis of the rear axles, the front axle tipping about its central pivot to accommodate such movement. It has been found that trucks constructed in this manner may travel very rapidly over exceedingly rough ground.

Having thus described my invention what I claim is:—

1. In a truck, the combination with a frame, of fixed axle members therefor, endless treads, drive wheels within the treads and mounted on said members, an axle pivoted to the frame, a rigid beam connecting one of said fixed axle members with said pivoted axle, rollers carried on the beam for holding the lower reach of the tread in contact with the ground, and wheels on the movable axle over which treads may run.

2. In a truck construction, the combination of a frame, flexible treads, tread driving wheels on opposite sides of the frame, non-shiftable axle means on which said wheels are mounted, other aligned wheels within each tread, a shiftable axle on which said last named wheels are mounted, said axle being freely movable at each end away from the frame, and having a one-point connection with said frame, a connecting beam pivoted to the non-shiftable axle and adjustably engaging the shiftable axle to allow differential motion of the ends of said shiftable axle relative to the frame during operation.

3. In a truck, the combination of a frame, a non-shiftable rear axle extending outwardly from the frame, wheels on said axle, another axle intermediately pivoted to the frame and having wheels aligned with the first mentioned wheels, and a rigid beam connecting said axles and pivoted about one of said axles and adjustably engaging the other.

4. In a truck, the combination of a frame, an axle member extending outwardly from the frame, a bearing for said axle member rigidly mounted with relation to the frame, a tread belt, an axle intermediately pivoted to the frame, aligned wheels within said belt on one end of said axle and said axle member, means for positioning the other end of said axle, and a rigid connecting strut movably engaging said axle and axle member.

5. In a truck frame, separated aligned axle members, each having separate bearings, wheels on said axle members, tread belts extending over said wheels, an axle intermediately pivoted near the opposite end of the frame and movable longitudinally of the frame, wheels mounted on the intermediately pivoted axle, and connecting longitudinally adjustable struts between said axle members and said axle.

6. In a truck frame, non-shiftable axle members, wheels on said members, tread belts extending over said wheels, an axle near the opposite end of the frame and movable longitudinally of the frame to tension the tread belts, wheels mounted on said last mentioned axle, connecting struts between said axle and axle members, adjusting mechanism on said struts for moving the axle with relation to axle members, a loose connection between the shiftable axle and frame affording a pivotal motion of said axle in a plane transverse to the frame during operation.

7. In a truck, the combination with a frame of non-shiftable axle members, means for driving said axle members, an intermediately pivoted axle movable longitudinally of the frame toward and away from the first mentioned axle members, aligned wheels on said axle and on said axle members, a strut pivotally embracing a non-shiftable axle member and extending over and embracing the pivoted axle, a sliding block engaging the pivoted axle and swivelly connected with said strut, and means for moving said block with relation to the strut.

8. The combination with a truck frame, of non-shiftable rear axles, a front axle, a clevis carried by the frame and intermediately embracing and pivoted to the front axle allowing movement thereof toward and away from the rear axles, treads and wheels therefor mounted on said axles, a rigid connecting strut between the axles on each side of the frame, and means for shortening or lengthening said struts.

9. The combination with a truck frame, of non-shiftable axles, a shiftable axle, wheels on said axles at each side of the frame, tread belts running over said wheels, means for driving the wheels on the non-shiftable axles to drive the belts, a rigid beam journaled around each of the fixed axles and having a bifurcated member extending over the shiftable axle, a swivel block within said bifurcated portion capable of longitudinal movement and embracing the shiftable axle, and capable of tipping movement with relation to the beam.

10. The combination with a truck frame, of non-shiftable axles, an axle shiftable relative to the frame, wheels on said axles at each side of the frame, tread belts running over said wheels, means for driving the wheels on the non-shiftable axles to drive the belts and rigid beams journaled around the non-shiftable axles, and having a universal joint connection with the shiftable axle.

11. In a truck, the combination with a frame, of a non-shiftable rear axle, a shiftable front axle, wheels on said axles, treads running over said wheels, means for driving certain of said wheels, a rigid beam embracing and journaled to one axle and having a bifurcated end extending over the other axle, a partially cylindrical surface within said bifurcated end, a slide in said surface supporting said shiftable axle and having a complementary surface whereby the slide is capable of movement longitudinally of the beam, and capable of turning about an axis longitudinally of the beam, a screw swivelly attached to said block, and means connected with the screw for moving said block.

12. In a truck frame, independent fixed axles having drive wheels thereon, a single axle pivoted intermediate its ends for motion relative to the frame, aligned wheels on said axles, treads extending around said wheels, and rigid beams connecting said fixed and movable axles, said beams each having one end journaled on a fixed axle, and the other end secured to the movable axle.

13. The combination with a truck frame, of non-shiftable axles carried thereby, a wheel on each axle and at each side of the frame, belts extending over said wheels, a pivoted axle connected with the frame, means whereby the pivoted axle may be shifted longitudinally of the frame, rigid beams pivoted about the non-shiftable axles and universally connected to the shiftable axle, and wheels on the shiftable axle engaging the belts.

14. In a truck frame, a non-shiftable rear axle, a front axle pivotally connected to the frame, wheels on said axles, treads movable around said wheels, rigid beams connecting the front with the rear axles, and means associated with said beams for permitting the front axle to move toward and from the rear axle during operation.

15. In a truck frame, the combination with driving axles of a clevis pivoted to the frame, a single axle pivoted in the clevis, wheels on said axles, treads extending around said wheels, and rigid beams connecting said fixed and movable axles.

16. In combination, a truck frame, a pair of non-shiftable axles carried thereby, a bifurcated member depending from the frame, and pivoted to it on a vertical axis, an axle pivoted to said bifurcated member, aligned wheels carried at the ends of said axles, and treads extending around said wheels.

In testimony whereof, I hereunto affix my signature.

HOLLIS H. HARRIS.